Figure 1:
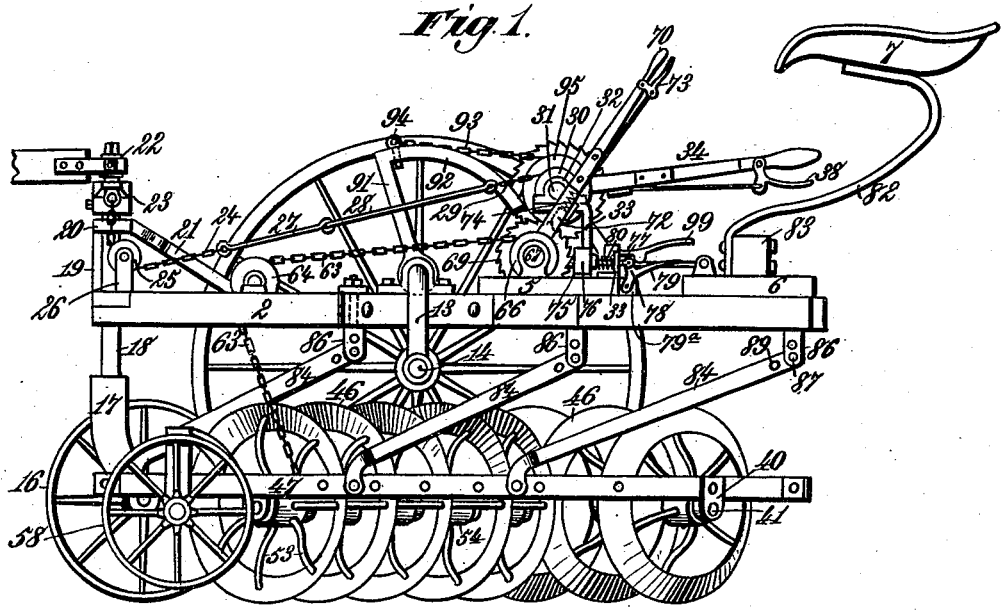

(No Model.) 4 Sheets—Sheet 1.

G. P. CLEVELAND.
ROTARY PLOW.

No. 486,325. Patented Nov. 15, 1892.

Witnesses.

Inventor:
George P. Cleveland.
By James L. Norris.
Atty.

(No Model.) 4 Sheets—Sheet 2.
G. P. CLEVELAND.
ROTARY PLOW.
No. 486,325. Patented Nov. 15, 1892.
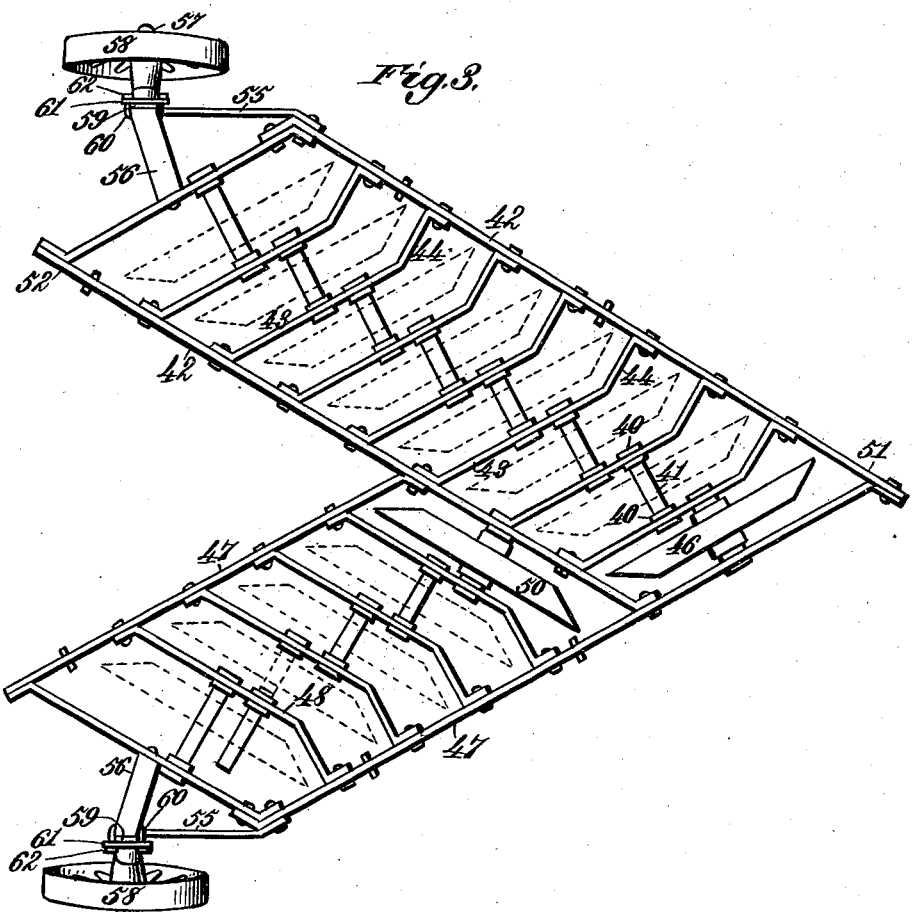
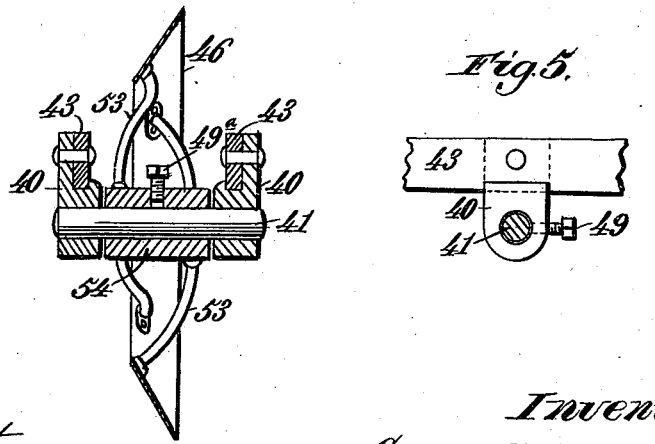
Witnesses:
Inventor:
George P. Cleveland.
By James L. Norris.
Atty.

(No Model.)  4 Sheets—Sheet 3.
G. P. CLEVELAND.
ROTARY PLOW.
No. 486,325. Patented Nov. 15, 1892.
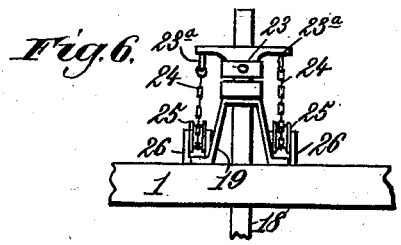
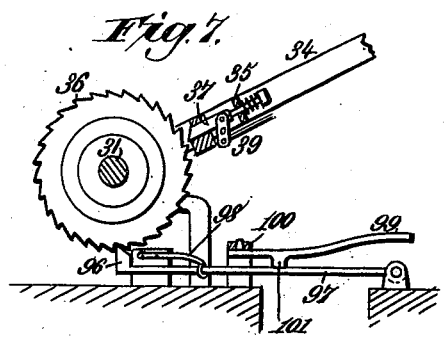
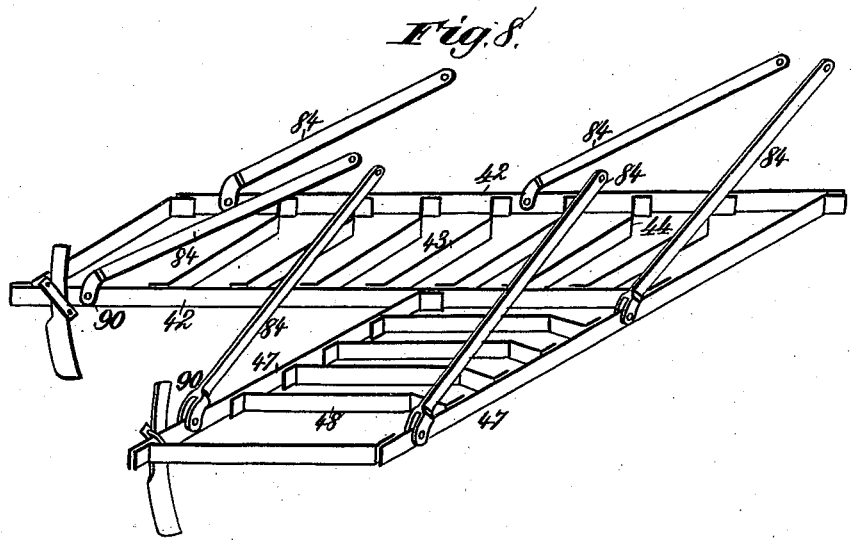
Witnesses.
Inventor.
George P. Cleveland,
By James L. Norris,
Atty.

(No Model.) G. P. CLEVELAND. ROTARY PLOW. 4 Sheets—Sheet 4.

No. 486,325. Patented Nov. 15, 1892.

Witnesses.
Robert Garrett,
J. A. Rutherford.

Inventor:
George P. Cleveland,
By James L. Norris.
Atty.

UNITED STATES PATENT OFFICE.

GEORGE P. CLEVELAND, OF COLEMAN, TEXAS.

ROTARY PLOW.

SPECIFICATION forming part of Letters Patent No. 486,325, dated November 15, 1892.

Application filed June 20, 1892. Serial No. 437,287. (No model.)

*To all whom it may concern:*

Be it known that I, GEORGE P. CLEVELAND, a citizen of the United States, residing at Coleman, in the county of Coleman and State of Texas, have invented new and useful Improvements in Rotary Plows, of which the following is a specification.

My invention relates to that class of plows in which one or more gangs of disks or annular plates of cupped form are employed to cut, break up, and turn the soil, the mechanism referred to being substantially of the type shown and described in the United States Letters Patent granted to me upon the 30th day of June, 1891, No. 455,171.

It is one purpose of my present invention to provide a gang-plow of this type having such construction that the cupped annular plows shall cut and break up the solid soil with that portion of each plow which lies forward of a line dropped from the axis or center of said plow, the only work performed by that portion lying upon the other side or in rear of said line being the turning of a large part of the cut and comminuted soil into and beyond the furrow of the preceding plow-annulus. It is my purpose, in other words, to so organize a gang-plow of this type that it shall cut and break the soil with the minimum degree of friction and with a great reduction in the power heretofore required for the operation of plows of this class.

It is my purpose, also, to provide a gang-plow having annular plow-blades combined with colters arranged upon the working frame at such points that they shall cut and displace the solid soil at points in planes parallel with the line of draft and passing behind the axes of the annular plow-blades in advance, thereby opening the furrow for the rearward portion of the leading plow-annulus in each gang.

It is my purpose, also, to provide a gang-plow having annular plow-blades so arranged that they shall cut furrows which shall be practically flat at bottom.

It is my further purpose to provide a gang-plow having a double series of rotary plows, consisting of cupped annuli, the two series arranged at an acute angle and the members of each series arranged at an acute angle with the line of draft, said plows being capable of operating in either direction to cut a series of furrows and remove the soil from a substantially median or central line toward both sides, or, on the other hand, to remove the soil from the lateral portions of the ground cut by the plow and carry it toward the center or median line.

It is my further purpose to simplify and improve the construction and operation of plows of this type, to lighten and lessen the labor of operating the same, to render the draft of the plows adjustable, to provide a suitable frame or frames wherein the rotary plows may be journaled, to enable the supporting frame or frames to be reversed upon the running-gear of the plow, and to make provision for lifting and lowering the gang or gangs of plows, whereby they may be transported by means of the ground-wheels and lowered at their point of destination to perform their work.

To enable those skilled in the art to make, construct, and use my said invention, I will proceed to describe in detail a plow constructed in accordance therewith, the invention consisting in the several novel features of construction and new combinations of parts hereinafter described, and then definitely pointed out in the claims.

In the following description reference will be made to the accompanying drawings, in which—

Figure 2:
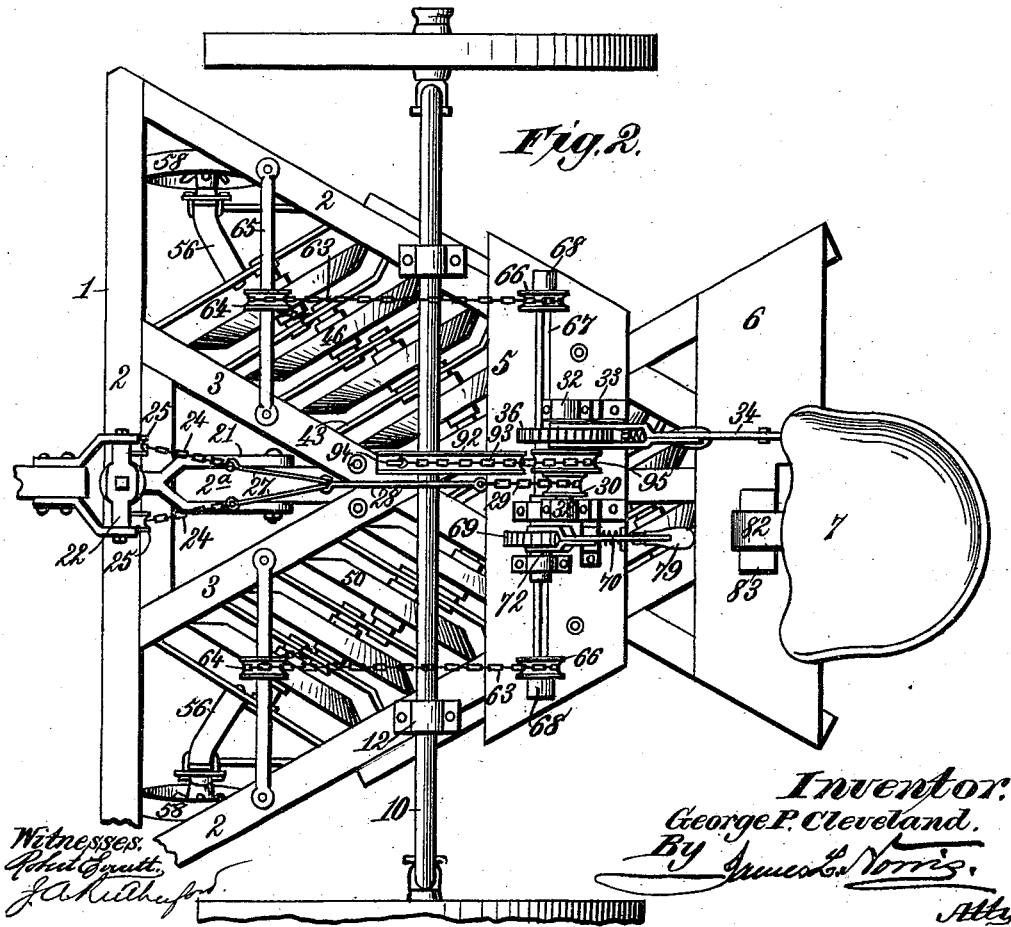
Figure 9:
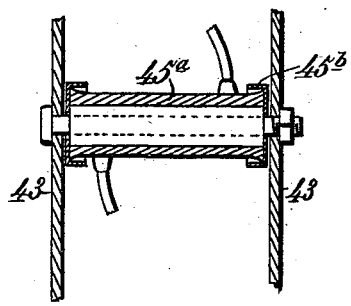
Figure 10:
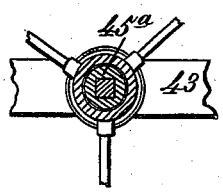
Figure 11:
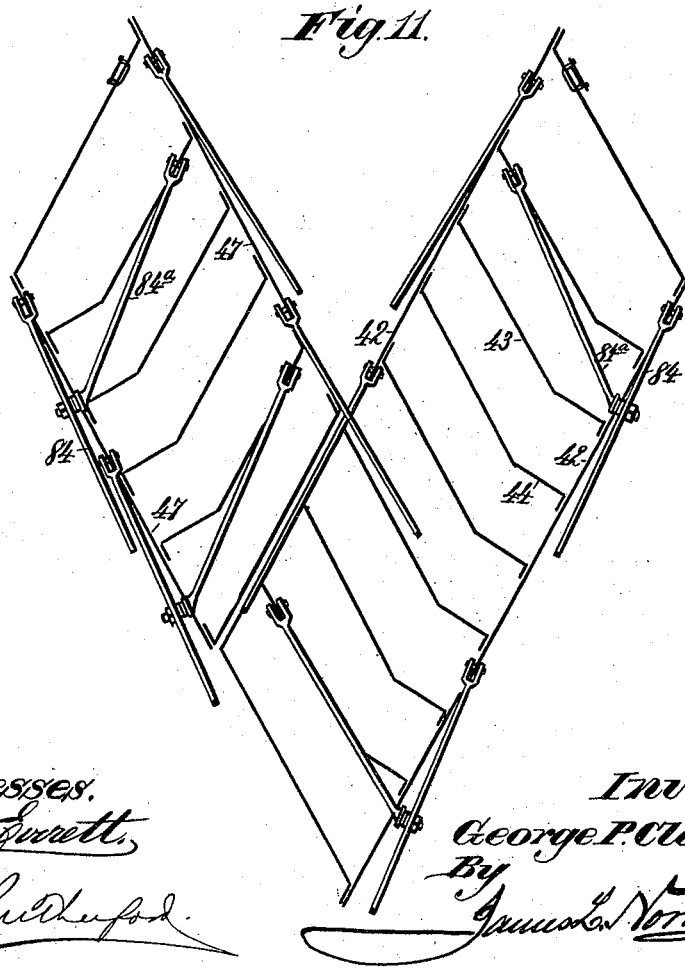

Figure 1 is a side elevation of a plow embodying my invention, one wheel being removed to show more clearly the construction and arrangement of parts. Fig. 2 is a plan view of the parts shown in Fig. 1. Fig. 3 is a plan view of the working frame, a single plow-annulus in each being shown in full lines and the remainder in dotted lines. Fig. 4 is a detail section of one of the plow-annuli, taken in a vertical plane passing through the axis and its supports. Fig. 5 is a detail face view of part of one of the brace-bars supporting the plow-annulus in Fig. 4. Fig. 6 is a detail face view of part of the front of the plow-frame, showing part of the standard and part of the raising and lowering devices. Fig. 7 is a detail view of the ratchet, the holding-pawl, the pawl-releasing device, and part of the ratchet-operating lever on the shaft by which the axle and the attached plow-frame are raised and lowered. Fig. 8 is a perspective view of the working frame, its push-bars, and colters, the plow-annuli, with their supporting-spindles, and the gage-wheels being removed. Fig. 9 is a detail section showing a modified construction of the spindles carrying the annular plows. Fig. 10 is a transverse section of Fig. 9. Fig. 11 is a plan view of the working frame, showing a construction adapted for large plows.

The reference-numeral 1 in said drawings indicates the frame of the plow, which consists of three triangularly-arranged beams 2, forming substantially an equilateral triangle. One of these beams is at the front and lies parallel with the axle and united therewith are two beams 3, which are parallel with the lateral beams of the triangular frame. The beams 3 cross each other as well as the lateral beams of the triangular frame, their diverging ends extending some distance in rear of the points of intersection with the latter. A platform 5 is laid upon and bolted to the beams 3, and in rear of this platform is a suitable platform or base 6, for the use of the person operating the plow, who will occupy a seat 7 of any suitable form. Said seat is supported upon a strong elastic plate mounted on the platform 6. The main support for the plow-frame is upon the axle 10, which passes across the triangular frame in front of the platform 5, where boxes 12 are provided, in which the axle has bearing. Between the wheel and the lateral beams of the frame the ends of the axle are bent at right angles with the main portion, forming arms 13, from the ends of which project the journals 14, which enter the axle-boxes of the wheels. The purpose of this construction is to enable the entire plow-frame, with all its adjuncts, to be raised and lowered for purposes which will be fully explained hereinafter, one object in view being to enable the operator to regulate the depth of draft of the plows to any suitable degree. The mechanism by which this is accomplished will be explained in its proper order.

The forward end of the plow-frame is supported by a caster-wheel 16, journaled between the arms of a fork 17, from which rises a standard 18, which passes up through the front beam of the plow-frame and through the top of a yoke-bracket 19, mounted upon said frame. Extending above the top portion of this bracket the standard 18 passes through an eye 20 upon the end of a strong brace 21, which extends rearward with a downward inclination, being forked to lap upon the outer faces of a central longitudinal beam $2^a$. Above this eye 20 a cross head 22 is mounted upon the squared end of the standard 18, and upon the ends of this cross-head are mounted the arms of the fork upon the end of the tongue or draft-pole. Between this cross-head 22 and the eye 20 is a collar 23, having opposite lugs provided with eyes $23^a$, to which chains 24 are attached. These chains pass down and are carried beneath pulleys 25, which are journaled in U-shaped supports 26, mounted upon the front of the plow-frame. One pulley of this kind is placed upon each side of the central longitudinal line passing through the standard 18, and the chains 24, after passing under said pulleys, are led toward the rear and brought together, their ends being united by rods 27 to a main rod 28. A chain 29, connected to the rearward end of this rod, passes over a pulley 30, mounted upon a shaft 31, which is supported in boxes 32, lying upon supporting-pieces 33, by which the shaft is raised above the surface of the main platform. By the revolution of this shaft the plow-frame will be raised and lowered bodily to any suitable degree. The shaft is actuated by means of a lever 34, having a forked extremity, the ends of the arms of the fork being provided with eyes or loops, which loosely encircle the shaft 31. The arms of the fork 35 on said lever straddle a ratchet 36, fast on the shaft 31, with the teeth of which a pawl 37 has engagement, said pawl sliding between the arms of the fork and being operated by a spring-pressed lever 38, mounted on the upper part of the lever 34 and having a finger 39 linked to the sliding pawl.

Beneath the plow-frame 1 is arranged a metallic working frame composed of two wings. One of these wings consists of parallel side bars 42, connected at suitable and substantially-equal intervals by brace-bars 43. The latter are inclined with relation to the side bars at an angle of about 62.5° and are rigidly and strongly connected thereto in any preferred manner—as, for example, by bending the extremities of the brace-bars to enable the bent ends to lie flat against the inner faces of the side bars and bolting or riveting through the same, as shown in the drawings. At one end each brace-bar is bent to form a portion 44, which is at an angle of about 27.5° with the remaining portion of the brace-bar, and upon the same side of the brace-bar which forms this angle is mounted a spindle-supporting bracket 40, which hangs beneath the brace-bar and engages its lower edge by a notch in the bracket. In the latter is formed a seat which receives a spindle or journal 41, standing at right-angles to the brace-bar. Upon this journal is mounted a rotary plow consisting of an annular plate 46, dish-shaped or cupped in such manner that its inner and outer faces shall represent the inner and outer surfaces of a truncated section of a right cone or conical shell, whose generating angle is 62.5° with the perpendicular. The cupping or inner face of the annulus therefore will make an angle of 27.5° with the plane of truncation or with the parallel plane of the base of the cone. This annulus will vary in diameter in proportion to the size of the plow and in some degree, also, by reason of a change of soil in which the plow is used. For example, when used in any ordinary soil the annulus will preferably be about nineteen or twenty inches in diameter; but when employed in breaking soil that is disposed to adhere to the annulus the diameter may be increased with advantage to about twenty-two or twenty-three inches.

A set-screw 49 is tapped through one of the brackets supporting the spindle, its end bearing against the same when the screw is turned up to lock the spindle and compel the plow to turn thereon, or, when desired, to release the same and permit it and the plow to revolve together. In this way wear of the journal may be avoided in a large measure. In the latter case stated a second set-screw 49ª, tapped through the hub of the plow, bears upon the spindle and locks it rigidly with said hub. The spindles 41 being at right angles with the brace-bars upon which they are mounted, said bars are arranged when the working frame is united with the running-gear at an angle of 27.5° with the line of draft or with the longitudinal lines of the plow. By this arrangement the plane of rotation of the annuli 46 of the plow will be at an angle of 27.5° with the line of draft. As the cupping of each annulus is at a further angle of 27.5°, it will be seen that the plane of cutting action of the cupped annulus in the horizontal plane of the spindles 41 will be substantially parallel with the lines of draft.

When the annular plows are large, so as to hold the working frame high up, I prefer to use the form of spindle shown in Figs. 9 and 10. Instead of attaching brackets 40 to the brace-bars 43 I pass a square bolt through the axial center of a cast-metal spindle 45ª. The square bolt takes the place of the brackets 40. Upon the ends of the plow-hub 54 are mounted sand-cups 45ᵇ, which act as washers, also. The spindles 45ª are usually increased in diameter, proportionately to the increased diameter of the annular plow, to decrease the leverage exerted by the enlarged annular plows. In order to render the sand-cups effective, the ends of the plow-hub 54 should be of somewhat greater diameter than the body-portions.

The frame thus far described is substantially a parallelogram, the only variation from such a form being the short sections 44 of the brace-bars 43. To the side bar 42, at the end of the same, is connected the second wing of the working frame. This wing, like the first, is composed of two parallel side bars 47, connected by brace-bars 48 in exactly the same manner already described in connection with the first wing. The two wings in small plows are united rigidly in such manner that the side bars 47 shall lie in substantial parallelism with the brace-bars 43 of the first wing, whereby the side bars 42 of the latter will be in parallelism with the brace-bars 48 of the second wing. In large plows, however, I prefer to disconnect the wings, or construct them as separate parts as shown in Fig. 11. In this construction the parts are connected to said wings in substantially the same way as that hereinafter described in connection with a working frame in which both wings are united rigidly, with the exception explained hereinafter. Formed or mounted upon the said brace-bars 48 are bracket-bearings for the spindles, similar to those shown in the first wing and having a like purpose and arrangement. Upon these spindles are mounted plow-annuli 50, which are duplicates of those already described. In short, the second wing of the working frame is a duplicate in all its parts and adjuncts of the first wing, which has been described. The only feature of difference between these two parts of the working frame is their difference in length. The end of the second wing is connected to the side bar 42 of the first at such a point that the side bar 47 of the second wing will practically form a continuation of the end brace-bar 42 of the first wing. This side bar 47, in conjunction with the last brace-bar 42, forms an acute-angled extremity 51 to the working frame. At the other end the acute-angled point 52 of the second wing is arranged to lie in or nearly in a line drawn at right angles to the line of draft and touching the similar extremity of the first wing. There will be variation, of course, from these features of construction, as no one plow may in all points be exactly identical with any other. I mention the said features in order that it may be clearly understood why one wing of the working frame will be of greater length and contain a larger number of annuli than the other. For example, the length of the second wing, consisting of side bars 47 and brace-bars 48, will be less than that of the other wing by the width of the wing and will contain five or six annuli 46, while the other wing will contain eight or nine, or thereabout. Each annulus is connected by staggered spokes 53 to a hub or box 54, which has bearing upon the spindle 45. The interval between the annuli 46, measured at right angles to the line of draft, is governed by the size of the plow used. For a nineteen-inch plow it is three inches. In other words, if lines be drawn parallel with the line of draft and tangent to the outer peripheries of the several annuli these lines will be separated by intervals of three inches. Thus, a gang of ten nineteen-inch annuli would cut a furrow thirty inches in breadth. If lines be drawn across the series of lines mentioned at an angle of ninety degrees therewith, intersecting the longitudinal lines at the points tangent to the annuli, said cross-lines will be separated by intervals of six inches. By this arrangement each annulus will turn the soil it cuts into and beyond the furrow of the preceding annulus. Part of the soil will evidently be pushed through the open spaces between the spokes and more or less thereof will drop into the furrow formed by the annulus, through which such portions of the soil pass.

The working frame, composed of the two wings, as described, may be used with its converged extremity or acute-angled point 51 in front, or it may be reversed to bring the divergent acute-angled points 52 in front. In either arrangement a bracket-frame composed of angle-plates 55 and 56 is rigidly bolted upon the outer angle of each wing, and from said frame a spindle or journal 57 projects at right angles to the line of draft. Upon this spindle is mounted a ground-wheel 58. The spindle 57 forms part of an adjustable plate of metal 59, which lies against one face of the angle-plate 55, against which it is firmly held by a clip or yoke 60, the ends of which pass through openings in a plate 61 and receive nuts 62, by which the adjustable plate 59 may be securely clamped at any point of adjustment.

The working frame is connected to the plow-frame 1 by two separate classes of devices, one being the means by which an independent vertical adjustment is given to the working frame to raise it from the ground entirely and remove it from operation upon the soil. The second class of devices referred to are those by which the annuli are forced into the soil and the working frame propelled or driven forward, following the line of draft.

I have already described how the front of the plow-frame is raised and lowered by means of the chains 24, pulley 30, shaft 31, and lever 34. The devices by which vertical adjustment is given the working frame are wholly independent and consist of two chains 63, having their ends connected to the forward portions of the two wings of the working frame. From these points of attachment said chains pass upward and are carried over guide-pulleys 64, mounted upon independent shafts 65, which are rigidly attached to the upper surface of the plow-frame 1. From these pulleys 64 the chains 63 pass rearward above the axle and are received upon pulleys 66, which are mounted upon a shaft 67 a little in rear of and parallel with the axle. The shaft 67 is mounted in boxes or bearings 68 and extends in parallelism with the axle about an equal distance on both sides of the median longitudinal line of the plow-frame. At a suitable point between the pulleys 66 is a ratchet 69, mounted on the shaft 67 and straddled by the forked end of the lever 70, the arms of the fork being provided with eyes or loops which loosely surround the shaft. Between the arms of the fork 71 lies a movable pawl 72, link-connected to an elbow-lever 73, pivoted upon or near the hand-hold or free extremity of the lever 70. A spring 74 normally holds this pawl in contact or engagement with the ratchet-teeth, the function of the lever 70 being to rotate the shaft 67 and wind the chains 63 upon the pulleys 66. The ratchet 69 is held by means of a latch-pawl 75, arranged in a keeper 76, strongly bolted to the plow-frame in rear of the ratchet 69. To this latch-pawl is connected a short rod or pin 77, which extends rearward and passes through an aperture in one of the supporting-pieces 33 and has its rearwardly-projecting end connected to a lug 78 upon an elbow-lever 79, pivoted by the extremity of its angular arm upon a lug 79$^a$. A spring 80, coiled upon the rod or pin 77 between the supporting-piece 33 and the latch-pawl 75, serves to hold the latter in engagement with the teeth of the ratchet 69. The end of the elbow-lever 79 extends rearwardly and lies a little upon one side of the place usually occupied by the feet of the driver or operator as he sits in the seat 81. This seat is supported by a powerful leaf-spring or spring-plate 82, similar to those used upon harvesters and mowers and reapers, the lower end of said plate being strongly bolted to a block 83 upon the rearward part of the platform. This arrangement enables the driver or whoever occupies the seat 81 to operate the lever 79 and release the ratchet with his foot, leaving both his hands free to manage the reins and the lever operating the ratchet 69. The winding of the chains upon the pulleys 66 raises the forward portion of the working frame independently of the rise and fall of the plow-frame 1. The rearward part of the working frame is raised by the co-operation with said chains of the devices of the second class, which I will now explain.

Connected by their ends to the side bars 42 and 47 of both wings of the working frame are push-bars 84, which extend rearward, with an upward inclination, nearly to the under face of the plow-frame 1. In suitable seats in the beams of this frame are inserted strong bolts 85, having on their lower ends drop-bearings consisting of slotted or forked brackets 86, between the parts of which the end of the push-bar is inserted, a cross-pin 87 being passed through the same and through openings in the drop-bracket. A series of these openings are shown separated by any suitable interval to permit a limited vertical adjustment to be made, and I preferably form two or even more than two openings 89 in the end of each push-bar, whereby its acting length may in a limited degree be increased or diminished. These push-bars diverge or converge from their points of attachment to the plow-frame toward the points of attachment to the working frame, according to the arrangement of the wings of the working frame. If these diverge toward the front, the push-bars will follow the angle of divergence, or approximately so, in order that they may exert their stress upon the working frame in or nearly in the lines of the side bars of the wings. Two of these push-bars are connected to the outer side bars of the working frame, one being at or about the middle portion and the other at or near the forward outer angle of said frame. To the inner sides of the wings of the working frame a single push-bar only is connected, its end being pivotally fastened at or near the extreme front of each wing, or, in other words, at or near the inner acute angle of the forward end of each wing. The chains 63 are connected to each wing in rear of the first annulus 46, and when the frame is raised the strain of the chains 63 causes the points of attachment 90 of the inner push-bars to act as fulcrum-points, and, the power being exerted between the fulcrum and the weight, each wing may be considered a lever of the third order, and it is caused to rise and fall in substantial parallelism with the plow-frame by means of the parallelism of the push-bars 84. By taking up or letting out the chains 63 the working frame may be lowered bodily, and the depth at which the annular plows cut will be readily limited by these devices. The gage-wheels 58 upon each wing are also adjusted to the depth of cut.

When the wings of the working frame are separately formed, as shown in Fig. 11, push brace-bars 84ª are added to the mechanism already described, said bars being eyebolted at one end to the push-bars 84 near their upper ends. From these points of attachment said bars are carried across the wing of the working frame and their ends are forked over and bolted to the ends of the brace-bars 43. The ends of the push brace-bars 84ª, which pass through the push-bars 84, should be of such length as to admit the placing of a number of washers thereon to take up or shorten said bars. By this construction the wings are held rigidly against lateral play, and by lengthening the push brace-bars the wings of the frame will be tilted and given a slight downward inclination from their inner toward their outer side bars, thereby causing the annular plows to lean outwardly or away from the central line, thereby diminishing the angle which their cupping-faces make with the horizontal surface of the earth and proportionately reducing the draft, especially in solid soils.

The plow-frame is raised and lowered by swinging the body of the axle up or down in the manner about to be described. This adjustment of the plow-frame also changes the angle at which the push-bars act upon the working frame, and thus the force of the downward push or the pressure by which the plows are driven into the soil may be varied to almost any degree. For example, if the push-bars make alternate angles of forty-five degrees with the plow-frame and working frame one-half the whole force expended upon the draft will, other things being equal, be exerted in carrying the plow-annuli into the earth while the other half is expended in giving forward movement to the plow. Variations from this angle in either direction will throw the preponderance of force upon either set of devices, as will readily be understood. As this movement of the plow-frame up and down is attended by a limited rocking or oscillatory movement of the axle, I use the following devices for producing this movement. Upon the axle 10, not far from its central portion, is mounted a rigid lever-arm 91, which is about the length of the bent ends or arms 13, which carry the journals 14. On the end of this lever-arm is a curved bar 92, grooved in its outer face to receive a chain 93, the end of which is connected by a bolt 94 to the bar 92 near its junction with the lever-arm. The other end of said chain is connected to the grooved face of a pulley 95, mounted upon the shaft 31 between the ratchet 36 and the pulley 30. Being rigid upon the shaft 31, the operation of the lever 34 swings the lever-arm 91 and turns and at the same time raises or lowers the main horizontal part of the axle 10 with or without the plow-platform and its adjuncts. The ratchet 36 is locked in any position to hold the axle to any point of adjustment by a pawl or detent 96 upon the end of an arm 97, normally raised by a spring 98, to throw the holding-tooth, which lies below the ratchet, into the teeth of the latter. To release the same, the operator places his foot upon a lever 99, fulcrumed at its end upon a support 100, and having a point 101 bearing upon the upper face of the arm 97.

I have already stated that the working frame is used with the open or diverging ends of the wings in advance or with the apex of the working frame in advance. It should be noted, also, that in either arrangement the annular plows 46 may be rigidly locked against revolution and caused to act upon the soil by simply dragging through the same. This will be practicable in cases where the soil is light and easily penetrated and broken.

I desire to call special attention to the means provided for driving the annular plows into the soil to any required depth and for balancing the draft exerted upon the plow-frame and the downward push exerted by said plow-frame upon the working frame. It will readily be seen that by adjusting the inclination of the push-bars 84 any necessary preponderance of force may be exerted upon the working frame to drive the plows into the soil. On the other hand the preponderance of force may be thrown upon the frame and exerted in the line of draft. For example, if the push-bars 84 be at an angle of forty-five (45) degrees, or thereabout, with the horizontal one-half the whole draft exerted upon the plow-frame 1 will be transmitted as draft-power to the plow-frame, and the other half will be expended in driving the annular plows into the soil. If the plow-frame be lowered until the angle said push-bars 84 make with the said frame is twenty-two and one-half degrees, (22.5°,) or thereabout, then three-fourths of the draft exerted will be expended upon the plow-frame and be transmitted entire as draft power only to the working frame, while the remaining one-fourth ($\frac{1}{4}$) will be expended in burying the annular plows. These proportions, however, will be modified materially by the adjustment of the push brace-bars 84ª, by which the wings of the working frame will be tilted and the annular plows caused to lean, whereby the cupped faces will make a smaller angle with the horizontal, and thereby diminish the power required to bury the plows to the proper depth and revolve the same. It must be borne in mind, also, that when the cupped annular plows are buried to the proper depth their form and the inclination of their cupped faces will have a tendency to draw the plows into the soil. This tendency may be somewhat varied by the nature of the soil; but it will readily be understood that under the most favorable circumstances a downward draft might be exerted, which would be a positive factor of power to be overcome in imparting movement to the plow. For example, if the cupping of the annular plows produces a draft which tends to draw the plows deeper into the soil this force will when the plows are buried to their proper depth be resisted by the plow-frame, the result being that the downward draft will fall upon the wheels, which will either hug the ground more closely and bear thereon with a greater weight or be buried in the soft earth and increase the labor of the draft-animals.

By the mechanism to which I have referred the plow-frame may be adjusted in such manner as to place the push-bars at any required angle and lean the cupped annular plows more or less, as may be required by the nature of the soil.

What I claim is—

1. In a rotary plow, the combination, with a plow-frame, of a working frame, a series of rotary plows journaled therein and consisting of cupped annuli having planes of rotation at acute angles with the line of draft, their axes being successively displaced toward the center at an acute angle with the line of draft, and push-bars pivotally connecting the working frame with the plow-frame at two or more points upon each frame, substantially as described.

2. In a rotary plow, the combination, with a plow-frame and with a working frame, of a series of rotary plows consisting of cupped annuli having their planes of rotation inclined at acute angles to the line of draft and cupped at an angle to the plane of rotation substantially equal to the angle said plane makes with the line of draft, the spindles of said annuli being arranged, successively, one behind and to one side of the preceding spindle, one or more ground-wheels supporting one end of the working frame, and a plurality of push-bars pivotally connected to the plow-frame and inclined forward and downward in substantial parallelism and connected at separate points to the working frame, substantially as described.

3. In a rotary plow, the combination, with a plow-frame, of an axle having ends bent at right angles to form journal-supporting arms, wheels mounted on the journals, means for rocking the axle, and thereby raising and lowering the plow-frame, a working frame arranged beneath the latter, a series of rotary plows journaled upon spindles, and a plurality of push-bars pivotally connected to the plow-frame and extended forward and downward in substantial parallelism and pivotally connected to the plow-frame at separate points, substantially as described.

4. In a rotary plow, the combination, with a plow-frame, of an axle having ends bent at right angles and provided with journals at their ends to receive the wheels, means for rocking said axle to raise and lower its horizontal main portion, a vertical wheel-supported standard passing through the front of the plow-frame, an independent lift to raise and lower the forward end of the plow-frame upon said standard, a working frame having rotary plows, a plurality of push-bars pivotally connected to the plow-frame and inclined forward and downward, their lower ends connected to the working-frame at separate points, and a lift for raising and lowering the working frame to which said lift is connected between the points of attachment of the push-bars, substantially as described.

5. In a rotary plow, the combination, with a working-frame composed of two diverging wings, each having parallel side bars connected by a series of equidistant cross-braces provided with spindles, of two diverging series of rotary plows mounted on said spindles and consisting of annuli cupped upon their faces at an angle substantially equal to one-half the angle of divergence of the two series of plows, substantially as described.

6. In a rotary plow, the combination, with a plow-frame and a working frame composed of two diverging wings, each so arranged that its longitudinal line shall make an acute angle with the line of draft, of two series of rotary plows mounted in said wings upon spindles arranged one behind another in the longitudinal line of the wing, said spindles making acute angles with said longitudinal line substantially equal to the acute angles that the longitudinal lines of the wings make with the line of draft, substantially as described.

7. In a rotary plow, the combination, with a plow-frame and a working frame composed of two diverging wings united and arranged in such manner that their longitudinal lines make acute angles with the central line of draft on opposite sides of said draft-line, of a series of rotary plows mounted in each of said wings, the plows in each wing having their axes of rotation at acute angles with the longitudinal line of said wing, and a plurality of push-bars connecting the plow-frame and working-frame at two or more points on each frame, substantially as described.

8. In a rotary plow, the combination, with a plow-frame and a working frame composed of two diverging wings, each consisting of parallel side bars connected by a series of cross-braces, said diverging wings being each so arranged that its longitudinal line shall make an acute angle with the line of draft, of spindles supported by the cross-braces of the wings one behind another in the longitudinal line of each wing and making angles with said longitudinal line substantially equal to the angles that the longitudinal lines of the wings make with the line of draft, rotary plows mounted on said spindles, and push-bars connecting the plow-frame and working frame, substantially as described.

9. In a rotary plow, the combination, with a working frame composed of two wings, of two divergent series of rotary plows journaled in said wings, one series upon each side of the line of draft, a plow-frame supported above the working frame upon an axle, means for lowering and raising the working frame, and a plurality of push-bars pivoted at their rear ends to supports upon the plow-frame, upon which they leave a limited vertical adjustment, the forward ends of said push-bars being pivoted to separate points on the working frame and inclining forward and downward in substantial parallelism from their points of attachment at the rear to the points of connection to the working frame, substantially as described.

10. In a rotary plow, the combination, with a working frame in which the annular plows are journaled, of a plow-frame arranged above, push-bars pivotally connected to both frames, and means for raising and lowering the plow-frame to vary the angle of inclination of said push-bars, substantially as described.

11. In a rotary plow, the combination, with a working frame containing cupped annular plows, of a plow-frame above the same, push-bars pivotally connected at their ends to said plow-frame and working frame, means for raising and lowering the plow-frame to vary the angle of inclination of the push-bars, and push brace-bars connected to the working frame and adapted to be varied in length to lean the cupped annular plows and vary the angle of inclination of their cupped faces, substantially as described.

12. In a rotary plow, the combination, with a working frame, of cupped annular plows journaled therein at an acute angle with the line of draft and arranged one behind and somewhat removed laterally with respect to the preceding plow and colters arranged to cut the soil in advance of the leading plow or plows in lines parallel with the line of draft and intersecting the plane of revolution of the leading plow at a point in rear of the axis of said plow, substantially as described.

In testimony whereof I have hereunto set my hand and affixed my seal in presence of two subscribing witnesses.

GEORGE P. CLEVELAND. [L. S.]

Witnesses:
P. P. RYNALDS,
H. D. WALKER.